US010134108B2

(12) United States Patent
Amirghodsi et al.

(10) Patent No.: US 10,134,108 B2
(45) Date of Patent: Nov. 20, 2018

(54) CONTENT AWARE SAMPLING DURING PATCH SYNTHESIS

(71) Applicant: ADOBE SYSTEMS INCORPORATED, San Jose, CA (US)

(72) Inventors: Sohrab Amirghodsi, Seattle, WA (US); Aliakbar Darabi, Newcastle, WA (US); Elya Shechtman, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1 day.

(21) Appl. No.: 15/286,245

(22) Filed: Oct. 5, 2016

(65) Prior Publication Data

US 2018/0096454 A1 Apr. 5, 2018

(51) Int. Cl.
*G09G 5/00* (2006.01)
*G06T 3/40* (2006.01)
*G06T 7/00* (2017.01)

(52) U.S. Cl.
CPC .............. *G06T 3/40* (2013.01); *G06T 7/0081* (2013.01); *G06T 2207/10004* (2013.01)

(58) Field of Classification Search
CPC ................................ G06T 6/40; G06T 7/0081; G06T 2207/10004
See application file for complete search history.

(56) References Cited

PUBLICATIONS

Kwatra et al., Graphcut Textures: Image and Video Synthesis Using Graph Cuts, Dec. 2003, ACM, 277-286.*

Han et al., Fast example-based surface texture synthesis via discrete optimization, Aug. 2006, Visual Comput., 918-925.*

Nealen et al., Hybrid Texture Synthesis, Dec. 2003, The Eurographics Association, 1-10.*

Liu et al., Optimizing Photo Composition, Dec. 2010, Eurographics 2010, 469-478.*

Anderson, D., & Wood, Z. (2008). User driven two-dimensional computer-generated ornamentation. Advances in Visual Computing, 604-613.

Beneš, B., Šťrava, O., Měch, R., & Miller, G. (Apr. 2011). Guided procedural modeling. In Computer graphics forum (vol. 30, No. 2, pp. 325-334). Blackwell Publishing Ltd.

(Continued)

*Primary Examiner* — Robert Craddock
(74) *Attorney, Agent, or Firm* — Shook, Hardy & Bacon, L.L.P.

(57) ABSTRACT

Embodiments of the present invention provide systems, methods, and computer storage media directed at image synthesis utilizing sampling of patch correspondence information between iterations at different scales. A patch synthesis technique can be performed to synthesize a target region at a first image scale based on portions of a source region that are identified by the patch synthesis technique. The image can then be sampled to generate an image at a second image scale. The sampling can include generating patch correspondence information for the image at the second image scale. Invalid patch assignments in the patch correspondence information at the second image scale can then be identified, and valid patches can be assigned to the pixels having invalid patch assignments. Other embodiments may be described and/or claimed.

20 Claims, 8 Drawing Sheets

(56) References Cited

PUBLICATIONS

Bradley, D., Nowrouzezahrai, D., & Beardsley, P. (2013). Image-based reconstruction and synthesis of dense foliage. ACM Transactions on Graphics (TOG), 32(4), 74.

Chen, G., Esch, G., Wonka, P., Müller, P., & Zhang, E. (Aug. 2008). Interactive procedural street modeling. In ACM transactions on graphics (TOG) (vol. 27, No. 3, p. 103). ACM.

Chen, X., Neubert, B., Xu, Y. Q., Deussen, O., & Kang, S. B. (2008). Sketch-based tree modeling using markov random field (vol. 27, No. 5, p. 109). ACM.

Chen, Y. S., Shie, J., & Chen, L. H. (2012). A npr system for generating floral patterns based on I-system. Bulletin of Networking, Computing, Systems, and Software, 1(1), pp. 38.

Emilien, A., Vimont, U., Cani, M. P., Poulin, P., & Benes, B. (2015). Worldbrush: Interactive example-based synthesis of procedural virtual worlds. ACM Transactions on Graphics (TOG), 34(4), 106.

Gieseke, L., Asente, P., Lu, J., & Fuchs, M. (Jul. 2017). Organized order in ornamentation. In Proceedings of the symposium on Computational Aesthetics (p. 4). ACM.

Ijiri, T., Mech, R., Igarashi, T., & Miller, G. (Apr. 2008). An Example-based Procedural System for Element Arrangement. In Computer Graphics Forum (vol. 27, No. 2, pp. 429-436). Blackwell Publishing Ltd.

Li, Y., Bao, F., Zhang, E., Kobayashi, Y., & Wonka, P. (2011). Geometry synthesis on surfaces using field-guided shape grammars. IEEE Transactions on Visualization and Computer Graphics, 17(2), 231-243.

Lipp, M., Wonka, P., & Wimmer, M. (Aug. 2008). Interactive visual editing of grammars for procedural architecture. In ACM Transactions on Graphics (TOG) (vol. 27, No. 3, p. 102). ACM.

Ma, C., Wei, L. Y., & Tong, X. (Aug. 2011). Discrete element textures. In ACM Transactions on Graphics (TOG) (vol. 30, No. 4, p. 62). ACM.

Ma, C., Wei, L. Y., Lefebvre, S., & Tong, X. (2013). Dynamic element textures. ACM Transactions on Graphics (TOG), 32(4), 90.

Maharik, R. I. (2011). Digital micrography (Doctoral dissertation, University of British Columbia).

Mech, R., & Miller, G. (2012). The Deco framework for interactive procedural modeling. Journal of Computer Graphics Techniques (JCGT), 1(1), 43-99.

Palubicki, W., Floret, K., Longay, S., Runions, A., Lane, B., Měch, R., & Prusinkiewicz, P. (2009). Self-organizing tree models for image synthesis. ACM Transactions on Graphics (TOG), 28(3), 58.

Parish, Y. I., & Müller, P. (Aug. 2001). Procedural modeling of cities. In Proceedings of the 28th annual conference on Computer graphics and interactive techniques (pp. 301-308). ACM.

Pirk, S., Stava, O., Kratt, J., Massih Said, M. A., Neubert, B., Mech, R., . . . & Deussen, O. (2012). Plastic trees: interactive self-adapting botanical tree models. ACM Transactions on Graphics, 31(4), 1-10.

Prusinkiewicz, P., & Lindenmayer, A. (2012). The algorithmic beauty of plants. Springer Science & Business Media.

Prusinkiewicz, P., Samavati, F., Smith, C., & Karwowski, R. (2003). L-system description of subdivision curves. International Journal of Shape Modeling, 9(01), 41-59.

Ritchie, D., Mildenhall, B., Goodman, N. D., & Hanrahan, P. (2015). Controlling procedural modeling programs with stochastically-ordered sequential monte carlo. ACM Transactions on Graphics (TOG), 34(4), 105.

Ritchie, D., Thomas, A., Hanrahan, P., & Goodman, N. D. (2016). Neurally-guided procedural models: learning to guide procedural models with deep neural networks. arXiv preprint arXiv: 1603.06143.

Šťava, O., Beneš, B., Měch, R., Aliaga, D. G., & Krištof, P. (May 2010). Inverse Procedural Modeling by Automatic Generation of L-systems. In Computer Graphics Forum (vol. 29, No. 2, pp. 665-674). Blackwell Publishing Ltd.

Stava, O., Pirk, S., Kratt, J., Chen, B., Měch, R., Deussen, O., & Benes, B. (Sep. 2014). Inverse procedural modelling of trees. In Computer Graphics Forum (vol. 33, No. 6, pp. 118-131).

Talton, J. O., Lou, Y., Lesser, S., Duke, J., Měch, R., & Koltun, V. (2011). Metropolis procedural modeling. ACM Transactions on Graphics (TOG), 30(2), 11.

Wong, M. T., Zongker, D. E., & Salesin, D. H. (Jul. 1998). Computer-generated floral ornament. In Proceedings of the 25th annual conference on Computer graphics and interactive techniques (pp. 423-434). ACM.

Xu, L., & Mould, D. (Oct. 2015). Procedural tree modeling with guiding vectors. In Computer Graphics Forum (vol. 34, No. 7, pp. 47-56).

\* cited by examiner

CONTENT AWARE SAMPLING DURING PATCH SYNTHESIS

BACKGROUND

Digital image editing has become increasingly more popular as digital image capture devices have become somewhat ubiquitous. An individual, for instance, may carry a mobile phone, dedicated camera, or the like that the individual can utilize to capture digital images of scenes (e.g., landscape, room, sporting event etc.) that are of interest. In some instances, these digital images do not capture the scene as desired. In such instances, digital image editing techniques can be employed to modify the digital image to achieve a desired result. Some of these digital image editing techniques utilize patch synthesis techniques that can be utilized to synthesize a region of the digital image. These digital image editing techniques may include, for example, image completion, image reshuffling, or texture synthesis. Patch synthesis techniques typically perform iterative analysis to identify correspondence between the region to be synthesized and corresponding regions from one or more images. These corresponding regions can include corresponding regions of the digital image itself that occur outside of the region to be synthesized. Such corresponding regions can then be utilized to generate the synthesized region.

It can be desirable to upsample information from a lower scale solution to assist with the patch synthesis process as the pixel density is increased. When upsampling patch corresponding information, however, invalid pixels can be created, such as pixels in the target region that are assigned a patch that corresponds to a pixel outside of the source region. Handling the resulting invalid pixels can pose various challenges. For example, invalid pixels may occur that are discontinuous with any valid pixel or that are a large distance from a valid pixel. To resolve invalid pixels, conventional patch synthesis processes can result in smoothing or blurring of features in an image. Further, such conventional processes can be difficult and time consuming.

SUMMARY

Embodiments of the present invention are directed towards patch synthesis techniques that utilize sampling of patch correspondence information (such as a nearest-neighbor field) when changing image scale between iterations. In particular, embodiments of the present invention are directed toward systems, methods, and computer storage media for identifying invalid patch assignments that may be created during sampling of patch correspondence information, and assigning valid patches to the pixels with invalid patch assignments. This can save computing time and resources by providing a method for resolving invalid patch assignments while maintaining the benefits of retaining patch correspondence information between iterations of a patch synthesis process.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION

Overview

Figure 1:
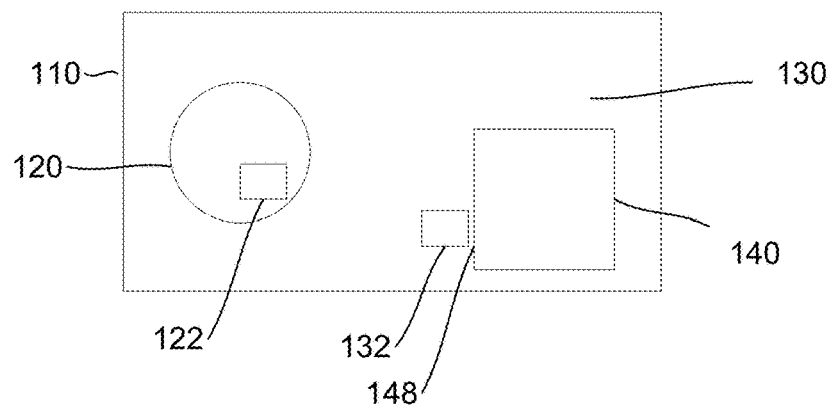
FIG. 1 illustrates an example of image during a patch synthesis process.

Patch synthesis techniques or processes can allow for synthesis of a portion of an image (a target region) based on sampling of other portions of the image and/or other images (a source region). As an example, a captured digital image may include an object that is undesirable (e.g., electrical transmission lines or poles, people, cars, etc.). In such instances, image completion may be used to fill in, or replace, the portion of the digital image that contains the undesirable object. To accomplish this image completion, a hole, created by removing the object from the digital image, can be filled utilizing a patch synthesis process to find one or more corresponding portions of the digital image and/or or a separate digital image. These corresponding portions can be utilized by the patch synthesis technique in filling the hole. More generally, patch synthesis techniques can be used in any image editing process where synthesis of a region of an image is desirable. Such digital image editing techniques may include, for instance, image completion, image reshuffling, texture synthesis, image retargeting, image warping, image blending, texture interpolation, image harmonization, style transfer, texture by numbers, or any other digital image editing technique that utilizes patch synthesis techniques.

Patch synthesis processes for synthesizing a target region of an image can often involve an iterative process where patches are initially assigned using a lower scale version of the image (i.e., lower pixel density), and then successively higher scales are used in subsequent iterations. It can be desirable to upsample information from a lower scale solution to assist with the patch synthesis process as the pixel density is increased. Unfortunately, as the masks for the target region and source region are also upsampled, portions of the additional pixels present at the higher scale may not correlate with the pixels at the lower scale in a desired manner. For example, upsampling information from a lower scale to a higher scale can typically involve using some type of correlation method to identify which pixel(s) at the lower scale is (are) used to provide information for a given pixel at the higher scale. Because the target mask is also upsampled, changes in shapes of the target mask during the change in scale can cause a pixel inside the target region at the higher scale to be correlated with a pixel (or pixels) outside of the target region at the lower scale. Similarly, changes in the shape of the upsampled source mask can cause a pixel inside the source region at a lower scale to be correlated with one or more pixels outside of the source region at the higher scale. When this occurs, a pixel in the target region can become an "invalid" pixel, or a pixel in the target region that is assigned a patch corresponding to a pixel outside of the source region. Depending on the nature of the target region geometry, handling of the resulting "invalid" pixels in the target region can pose a variety of challenges. For example, as resolution increases, invalid pixels may occur in portions of the target region that are discontinuous with any valid pixel. As another example, changes in the target mask and/or source mask during upsampling may result in creation of invalid pixels that are a large distance from a valid pixel.

Upsampling of information can involve a choice with regard to the type of information that is upsampled. Due to difficulties posed by the creation of invalid pixels during upsampling, a conventional choice for information upsampling can be to upsample the color information, texture information, and/or other visual display information from the lower scale. Upsampling of color or other display information can have the advantage of directly upsampling the information that is used to display the image. Additionally, the creation of invalid pixels can potentially be avoided and/or quickly resolved by allowing values for a pixel at a higher scale to correspond to a weighted average of a plurality of pixels from a lower scale image. When one or more of the lower scale pixels participating in the weighted average are invalid, the weights of the remaining pixels can be adjusted. Unfortunately, this type of upsampling of visual display information can tend to result in smoothing and/or blurring of features in an image. Given that a typical iterative process for patch synthesis can involve iterations at 15-20 different scales or more, smoothing and/or blurring introduced into the patch synthesis process can increase during multiple iterations, potentially leading to lower quality for the final image.

An alternative to upsampling the visual display information can be to upsample patch correspondence information that was determined at the lower resolution for the target region. As used herein, a patch can refer to a section, or grouping, of pixels in a digital image. This section may be of fixed or varying shape. For example, a patch may be defined as a fixed shape 5×5 or 7×7, where the dimensions indicate the number of pixels covered by the patch (e.g., a 7×7 patch covers an area of 7×7 pixels, or a total of 49 pixels). Each patch can be centered at a single pixel and can overlap patches centered at neighboring pixels. Thus each pixel can be covered by a number of overlapping patches. For example, considering a patch of dimensions 7×7, each pixel would be covered by a total of 49 overlapping patches. The result of an approximate nearest-neighbor search can be recorded in a map called a nearest-neighbor field (NNF). A nearest-neighbor field can be considered a mapping from a set of patches A in the target region to a set of patches B in the source region. A nearest-neighbor field is an example of patch correspondence information. Another example of patch correspondence information can be an incomplete nearest-neighbor field, where one or more pixels in a target region has an invalid patch assignment. Examples of patch assignments that can correspond to an invalid patch assignment include patch assignments based on the assigned patch being outside of the source region; pixels without a patch assignment; assignment to a pixel of a default or standard patch not associated with the source region; or random assignment of a patch from the source region to a pixel without subsequent comparison to a second patch as part of a patch synthesis process.

Patch correspondence information (such as a nearest-neighbor field) can be upsampled by using the lower scale patch correspondence information to determine a suitable correlation between target region pixels at the higher scale with source region pixels at the higher scale. Upsampling of patch correspondence information can provide an advantage relative to upsampling of color information in that information related to coherent regions identified at a lower scale iteration can be substantially transferred to a higher scale. In addition to providing suitable patches for the target region, these coherent regions within the target region can be identified or tracked using an active mask, so that these coherent regions are not processed at the higher scale. This can provide a substantial time savings, so long as that substantial time savings is not substantially reduced or minimized due to difficulties in treating invalid pixels during upsampling. Because the patch correspondence information for the target region corresponds to references for pixels to patches from the source region, as opposed to directly providing visual display information, patch correspondence information cannot simply be averaged to address invalid pixels. Additionally, due to the nature of how invalid pixels are created, identifying a suitable patch for invalid pixels can be difficult and/or time consuming.

In various aspects of the present invention, the difficulties related to creation of invalid pixels when upsampling patch correspondence information can be reduced or minimized by using a modified patch synthesis sequence to assign values to the "invalid" pixels. In some aspects, any invalid pixels created during upsampling can be assigned by starting at the invalid pixels and performing an incremental search, such as a concentric shell search, to identify a nearby location that has a valid pixel. The invalid pixel can then be assigned the value of the valid pixel at the identified location. In other aspects, indexes for the closest pixels marked as valid can be determined relative to each invalid pixel, where closest pixels are identified based on a distance transform or other type of distance calculation. The label for the closest valid pixel can then be assigned to the invalid pixel. In yet other aspects, a combination of both incremental outward search and label assignments can be used to resolve invalid pixels in a target region. An advantage of both the concentric shell search starting at invalid pixels and label assignment, as described herein, is that both types of procedures can be readily adapted for calculation in parallel. This can allow the calculations to be spread across multiple processors in an efficient manner.

More generally, the systems and methods described herein can be used for assignment of invalid pixels that are created either during sampling of an image at a first image scale during image processing to generate the image at a second image scale. Upsampling can refer to sampling of an image at a first image scale to generate an image at a second image scale that has a higher pixel density. Downsampling can refer to sampling of an image at a first image scale to generate an image at a second image scale that has a lower pixel density.

In various embodiments, processing of pixels in a target region can be assisted by using a plurality of masks to categorize pixels in the target region and/or in the overall image. One type of mask can be a validity mask that groups pixels within an image into a plurality of categories. A first category can correspond to pixels in the target region that have been successfully assigned a corresponding patch from the source region. Such pixels can be identified as valid. A second category can correspond to pixels in the target region that do not have an assigned corresponding patch from the source region. Such pixels can be identified as invalid. A third category can correspond to pixels that are outside of the target region. Such pixels can be identified as undefined, as pixels outside of the target region (by definition) do not need to be assigned a value by the patch synthesis algorithm.

A second type of mask can be an active mask. An active mask can be used to limit the processing of pixels within a target region to those pixels that have yet to converge. The active mask is utilized to differentiate between those pixels within the target region that are still active, or have yet to converge, and those pixels within the target region that are no longer active, or have converged. Utilizing such an active mask in one or more iterations of the patch synthesis technique can limit the processing of pixels that lie within the target region to only those pixels that are differentiated as active within the active mask. In doing this, the processing that would have been applied, under the current state of the art, to those pixels that have converged is skipped, which can save a great deal of processing time and resources.

For example, an active mask can be based on identifying groupings of pixels which have been determined to have converged as inactive. Identifying groupings of pixels that have converged can, in some embodiments, be based on a coherency analysis, such as that discussed extensively below. The remainder of such an active mask would identify those pixels that have yet to converge and are therefore still active. The patch synthesis technique described herein can be configured to take advantage of such an active mask and no longer process those groupings of pixels that are identified within the active mask as being inactive.

Creation of Invalid Pixels

Figure 2:
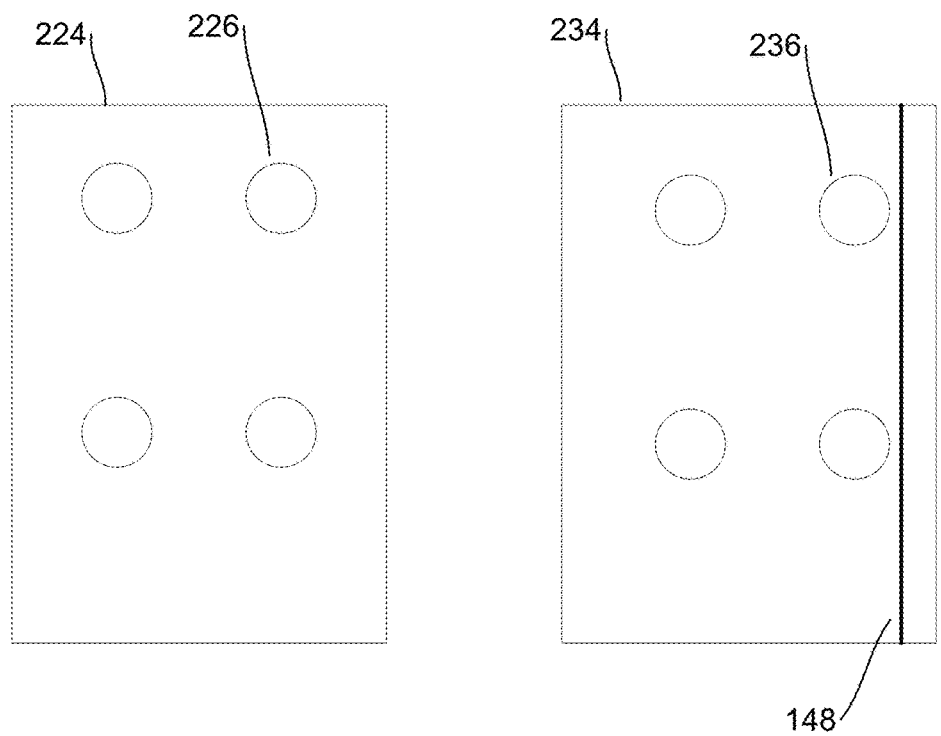
FIG. 2 illustrates an example of patch correspondence information between patches for pixels between a source region and a target region at a first image scale.
Figure 3:
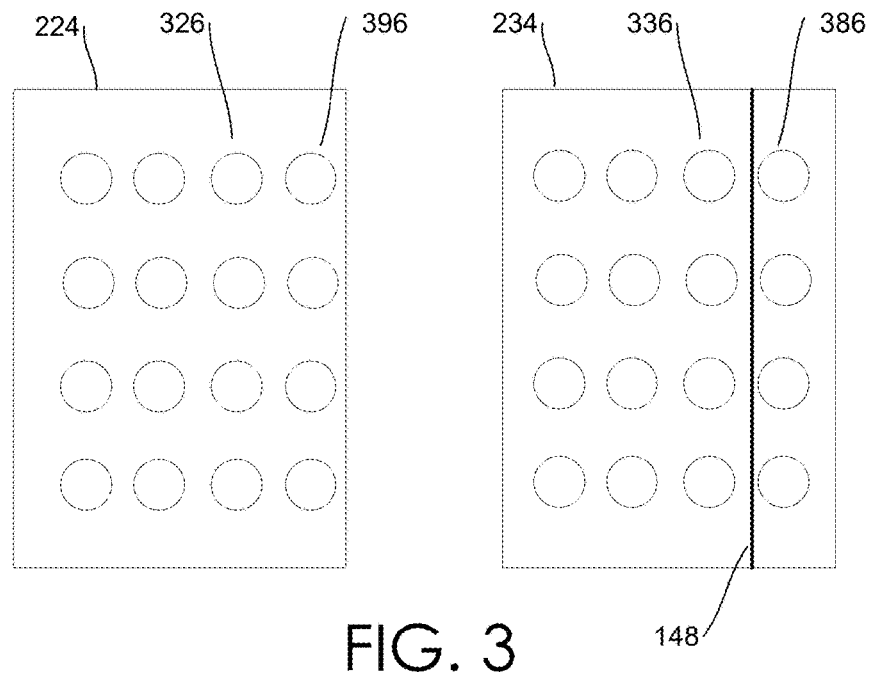
FIG. 3 illustrates an example of attempting to upsample the patch correspondence information of FIG. 2 to a second image scale.

During upsampling, one or more pixels in the target region can become "invalid" pixels. FIGS. 1-3 schematically show one example of how pixels can receive an invalid patch assignment during upsampling. FIG. 1 shows an example of a digital image 110 that includes a target region 120 and a source region 130. Source region 130 excludes target region 120, and also excludes an additional region 140. Additional excluded regions (such as additional region 140) can occur, for example, due to user designation of regions that should not be sampled as part of the patch synthesis process. In the example shown in FIG. 1, sample patch 132 from source region 130 has been identified as corresponding to patch 122 within the target region 120. It is noted that sample patch 132 is close to the boundary line 148 of additional region 140.

FIG. 2 schematically shows an example of a portion 234 of the source region in the vicinity of patch 132 and the corresponding portion 224 of the target region that is in the vicinity of patch 122. In FIG. 2, the scale of the figure is increased to allow for representation of individual pixels as circles. Based on the random sampling portion of the patch synthesis process, patches associated with pixels in column 236 have been assigned to the pixels in column 226 of the patch from the target region. FIG. 2 also shows the proximity of column 236 to boundary line 148.

FIG. 3 schematically shows an example where the image from FIG. 2 has been upsampled. In this example, upsampling results in the image in FIG. 3 having a pixel density that is increased by a factor of 4 relative to the image in FIG. 2. Based on the pixel assignments from FIG. 2, the upsampling algorithm can attempt to assign the patches corresponding to the pixels in columns 336 and 386 in portion 234 of the source region to the pixels in columns 326 and 396 in portion 224 of the target region. However, based on the nature of the upsampling, column 386 in the source region is on the opposite side of boundary line 148 relative to column 336. This means that column 386 is not part of the source region. Therefore, when assigning patches in the upsampled image, the pixels in column 396 in the target region are designated as "invalid" in the validity mask, as the patches from the pixels in column 386 represent an invalid assignment for the pixels in column 396.

In FIG. 3, the invalid pixels created during upsampling correspond to invalid pixels in column 396 that are adjacent to valid pixels in column 326. However, depending on the nature of the target region and source region, invalid pixels may occur at an arbitrary distance from the nearest valid pixel. In order to convert such invalid pixels to valid pixels, at least one additional patch assignment technique can be used.

Converting Invalid Pixels to Valid Pixels—Concentric Shell Search

One option for an additional patch assignment technique can be to identify a nearby pixel having a valid patch assignment. The patch assigned to the nearby valid pixel can then be assigned to the invalid pixel. In some embodiments, a nearby valid pixel can be identified by performing a concentric search on nearby pixels. Based on the coherency property of typical nearest-neighbor-field maps, pixels in close proximity to each other can often have similar patches. One option for identifying nearby valid pixels could be to perform a search starting from valid pixels to identify nearby invalid pixels. Such a search based on valid pixels, however, can be computationally expensive since the location(s) of invalid pixels are typically not known in advance. Instead, in various aspects searches for nearby valid pixels can be started from the invalid pixels. For example, an iterative search can be performed, with a larger search radius at each iteration. For a typical pixel layout corresponding to a two-dimensional array (i.e., pixels can be thought of as occupying the intersection points of a square tesselation), the search pattern can correspond to a series of concentric squares centered on an invalid pixel, with the "radius" of the square increased by one at each iteration. In other embodiments, pixel arrangements having different types of symmetry can be searched using a search pattern with a different shape. For example, a pixel layout based on a hexagonal ordering can be searched based on concentric hexagons with increasing radius at each iteration. This iterative process can continue for an invalid pixel until a valid pixel is identified during an iteration, or until an optional maximum search radius is reached. If an optional maximum search radius is used, the maximum search radius can correspond to any convenient value, such as a maximum value of 10, or a maximum value of 100, or a maximum value of 255, or a maximum value of 1000, or any other convenient maximum value.

Figure 4:
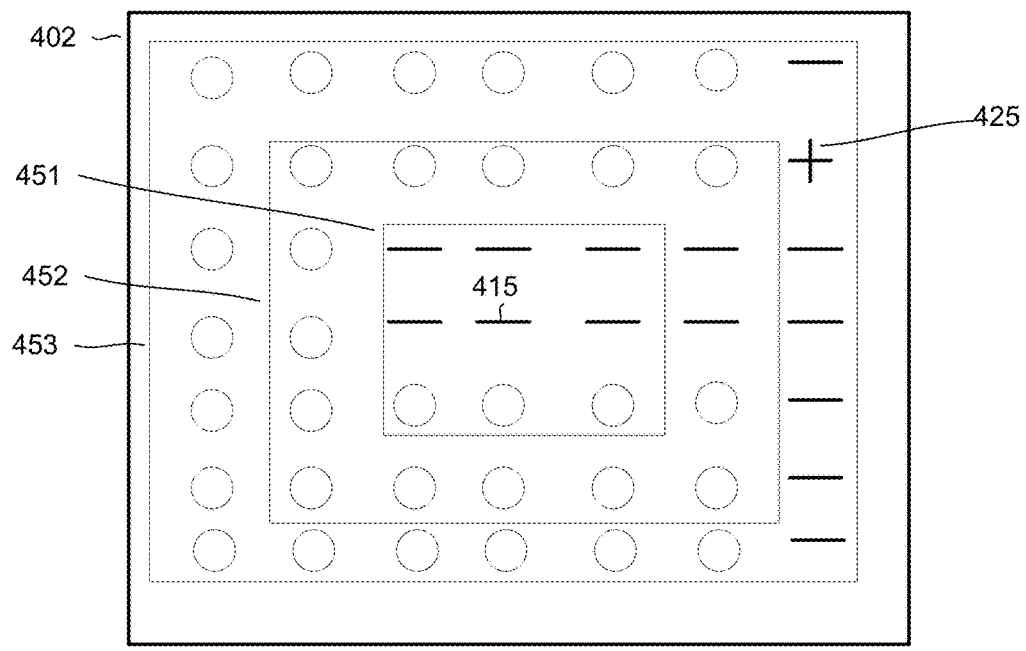
FIG. 4 illustrates an example of performing a concentric shell search for a valid pixel.

FIG. 4 shows an example of performing a search based on concentric shells having the shape of squares (or other rectangles) for a valid pixel in proximity to an invalid pixel.

In FIG. 4, diagram 402 schematically shows a portion of the pixels in an image. Pixel 415 represents an invalid pixel that is the subject of the concentric search. The "–" shape for pixel 415 indicates that it is an invalid pixel. A portion of the nearby pixels for 415 are also invalid. Another portion of the pixels are represented by a "o" shape to indicate that the pixels correspond to undefined pixels (i.e., pixels outside the target region) in the validity mask. Finally, valid pixels in diagram 401 correspond to pixels represented by a "+" shape, such as valid pixel 425. The designations for the various pixel types in FIG. 4 provide an example of pixel designations for a validity mask. FIG. 4 can, for example, be a representation of a portion of a target region where the target region has an irregular shape, leading to the small protrusion into a source region for the image.

Diagram 402 shows the series of concentric squares centered on pixel 415 that can be used to identify valid pixel 425. During a first iteration, pixels corresponding to a first shell of nearest neighbors, as represented by square 451, can be considered. The pixels inside square 451 correspond to either invalid pixels or undefined pixels, so the search radius is increased and another iteration is performed. In the next iteration, a larger group of pixels 452 corresponding with a second shell of nearest neighbors can be considered. It is noted that during the second iteration, only pixels corresponding to second shell 452 are considered, as the pixels corresponding to square 451 were considered in the previous iteration. Once again, second shell 452 does not contain a valid pixel. A third iteration can expand the search radius again to pixels corresponding to a third shell of nearest neighbors as represented by square 453. Because pixel 425 is a pixel within this third shell of nearest neighbors, pixel 425 is identified as a valid pixel during this iteration. The patch for pixel 425 can then be assigned to pixel 415, and the designation of pixel 415 can be changed in the validity mask from invalid to valid.

It is noted that during each iteration of this type of concentric shell search, the shell of corresponding nearest neighbor pixels at a given radius can correspond to a plurality of pixels. As a result, it is possible that the first shell containing a valid pixel may contain a plurality of valid pixels. In the event that more than one valid pixel is identified, the valid pixel used for determining a patch to assign to an invalid pixel can be selected by any convenient method. For example, if two valid pixels are identified at a given search radius, a first valid pixel may correspond to a valid pixel that was assigned during the initial upsampling process and/or a pixel that was assigned during an iteration of the patch synthesis process. A second valid pixel may correspond to a valid pixel that was assigned based on a previous iteration of the concentric shell search method. In this type of example, the first valid pixel can be selected for assignment to the invalid pixel. As another example, if a first pixel is fully converged and labeled "inactive" while a second pixel is still active, the first pixel can be selected for assignment to the invalid pixel.

Conversion of Invalid Pixels to Valid Pixels—Label Assignment

Another option for converting invalid pixels to valid pixels can be based on identifying the closest valid pixel, and then assigning the label from the closest valid pixel to the invalid pixel. Label assignment can be used instead of or as a complement to the concentric search assignment method described above.

For label assignment, a search is performed starting with each invalid pixel to identify the closest valid pixel based on distance. This can be evaluated using any convenient distance evaluation method. In some aspects a Euclidean distance evaluation can be used. In other aspects, it can be computationally efficient to perform distance evaluation using a distance transform. For aspects where a distance transform is used, the distance evaluation can be based on, for example, a chessboard distance transform or a Manhattan distance transform (sometimes referred to as a "taxicab" distance transform or a city block distance transform). It is noted that for an image of a given number of pixels, a distance transform can be pre-computed to allow for further time savings during label assignment. If a pre-computed distance transform is used, the distance between a given pixel and other relevant pixels (such as nearest neighbors) can be stored and then indexed when needed. After determining a closest valid pixel using a suitable distance transform and/or other distance calculation, the invalid pixel can be assigned the label corresponding to the valid pixel.

When both concentric search and label assignment are used, the methods can be complementary. For example the concentric search can be performed until a maximum search distance is reached. Any pixels that are still invalid after the concentric search can then be assigned based on label assignment. Optionally, if both the concentric search and label assignment techniques are available for use, it may be desirable in some aspects to skip the concentric search technique and only use the label assignment technique. For example, if the number of invalid pixels is large relative to the total number of pixels in an image, it may be computationally more efficient to skip the concentric search method and use only the label assignment method.

Patch Synthesis Overview

Figure 5:
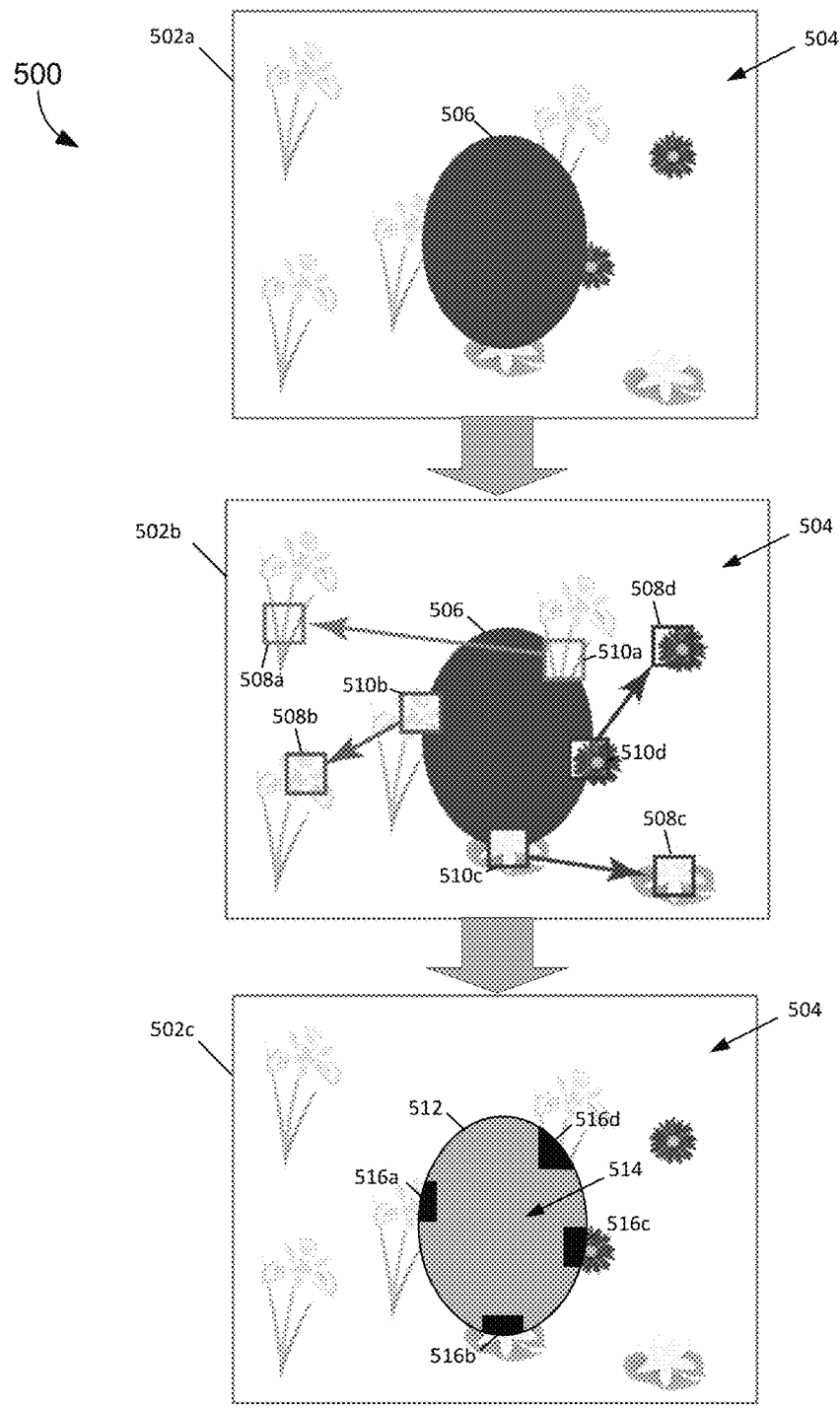
FIG. 5 illustrates a visual sequence that represents a general overview of an example digital image editing technique, in accordance with various embodiments of the present disclosure.

FIG. 5 illustrates a sequence 500 that represents a broad general overview of an example digital image editing technique, in accordance with various embodiments of the present disclosure. It will be appreciated that, because the intent of sequence 500 is to provide a broad general overview, many specific details are omitted from this discussion. These specific details, however, are discussed in reference to the remaining figures.

As depicted, sequence 500 begins at 502a with digital image 504. Digital image 504 represents an image that is stored in a digital format. Such a digital format could be, for example, a Joint Photographic Experts Group (JPEG) format, a Bitmap (BMP) format, a Tagged Image File Format (TIFF), a Portable Networks Graphic (PNG) format, A Graphics Interchange Format (GIF), or any other suitable format. Digital image 504 includes target region 506. As used herein, a target region of a digital image refers to a region of the digital image that is to be replaced with a region that has been synthesized through a patch synthesis technique. As depicted, target region 506 depicts an area of digital image 504 that is be filled utilizing portions of the remainder of digital image 504 as the source. As such, the area outside of target region 506 can be referred to herein as a source region. It will be appreciated that, in other embodiments, the source region could be one or more additional digital images. Target region 506 can be filled with a synthesized region that is generated utilizing a patch synthesis technique that can identify patches within the source region that correspond with patches in the target region.

Moving to 502b, an iterative search process of a patch synthesis technique has been performed to identify source patches 508a-508d from the source region that correspond with target patches 510a-510d. In some embodiments, this iterative search process is a repeated search of all patches in one image region (e.g., source region) to find the most similar patch to another image region (e.g., target region 506). This most similar patch can be referred to in the art as a nearest neighbor, or approximate nearest neighbor. The similarity of patches can be compared utilizing any patch distance metric, such as, for example, $L_p$. Additional details of such a search process are discussed in reference to FIGS. 6-8 and 11, below. Once source patches 508a-508d have been identified, the target region 506 can begin to be filled through a voting process of the patch synthesis technique. Such a voting process can be utilized to determine colors for pixels that lie within target region 506 utilizing source patches 508a-508d. As depicted, the source patches 508a-508d found by searching the source region of digital image 504 are ideal source patches that may not be able to be improved upon in any further iterations of the patch synthesis technique being applied. As such, these portions of target region 506 can be considered to have converged and, consequently, will not benefit from any further processing of the patch synthesis technique. However, the patch synthesis technique would continue through many additional iterations in order to generate a synthesized region that can fill target region 506. In each of these iterations, under the current state of the art, the portions of target region that have converged would again be processed through the searching and voting processes of the patch synthesis technique, although no change would occur to these converged portions.

In an effort to prevent at least some of this repetitive processing of these converged portions in the patch synthesis technique, at 502c an active mask 512 is generated. Active mask 512 identifies groupings of pixels that have been determined to have converged as inactive regions 516a-516d. Determining pixels that have converged is discussed in greater detail below, in reference to FIGS. 6, 7, and 9. The remainder of active mask 512 identifies active region 514. The patch synthesis technique can be configured to take advantage of active mask 512 and no longer process those groupings of pixels that are identified within active mask 512 as lying within inactive regions 516a-516d. It will be appreciated that, as the patch synthesis technique proceeds, the groupings of pixels that have been determined to have converged will continue to grow. As such, as the patch synthesis technique continues, the active mask can be continually updated to reflect this growth. Consequently, the impact of the active mask on processing speed and resources in later iterations of the patch synthesis technique may be magnified.

Figure 6:
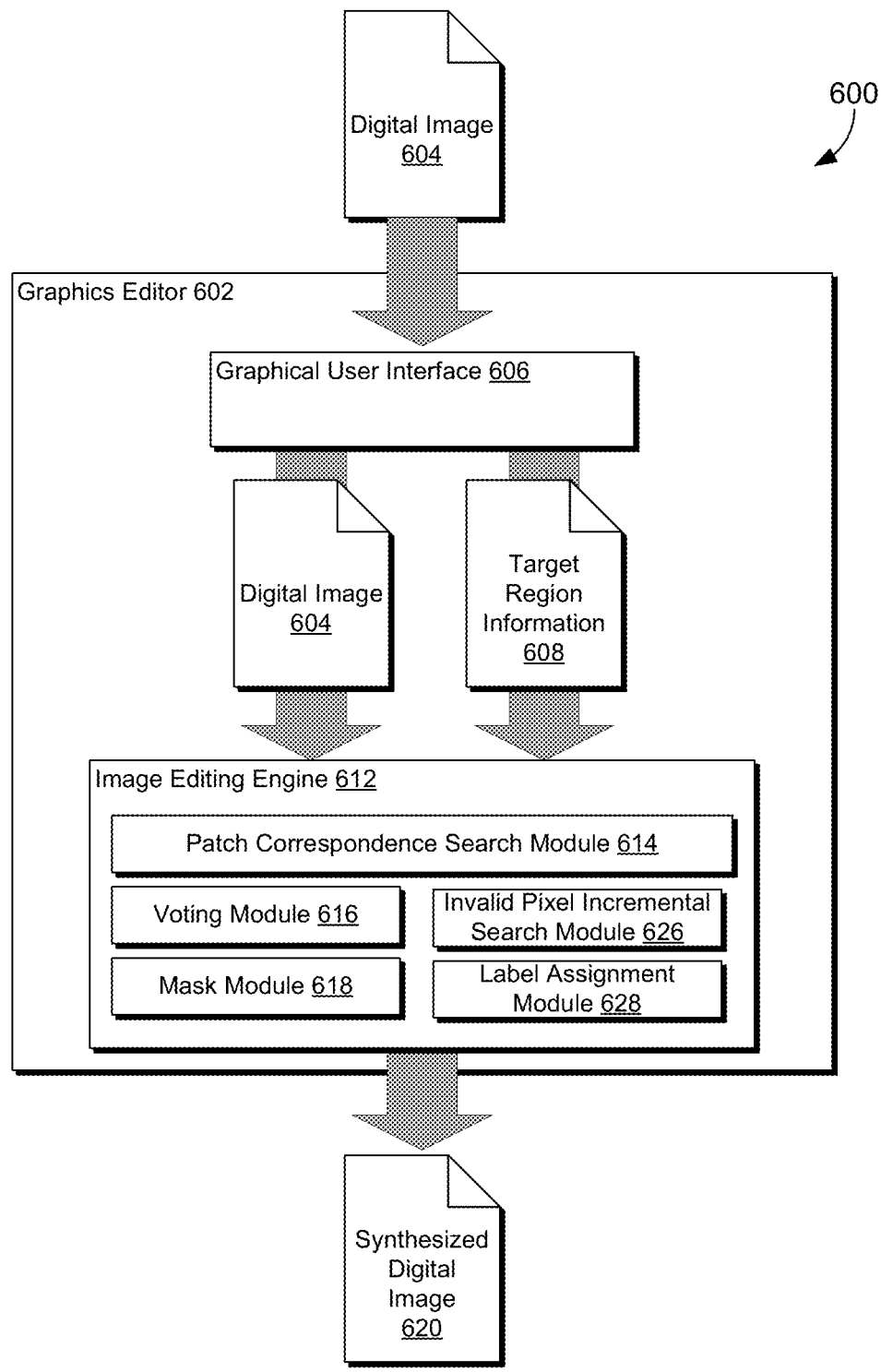
FIG. 6 depicts aspects of an illustrative graphics editing environment, in accordance with various embodiments of the present disclosure.

FIG. 6 depicts aspects of an illustrative graphics editing environment 600 in accordance with various embodiments of the present disclosure. As depicted, graphics editing environment 600 includes a graphics editor 602. Graphics editor 602 can be any suitable graphics editor, such as, for example, ADOBE® Illustrator or ADOBE® Photoshop (both available from Adobe Systems Inc. of San Jose, Calif.). Graphics editor 602 can be configured to provide, among other things, a user interface that facilitates a user of graphics editor 602 in manipulating a digital image, such as, for example, digital image 604.

Digital image 604 represents an image that is stored in a digital format (e.g., JPEG, BMP, TIFF, PNG, GIF, etc.). Digital image 604 can be stored digitally as a two-dimensional array of pixels that depict the object or scene captured by the digital image. Each of these pixels is assigned certain information, such as, for instance, color information. For example, in some embodiments, each pixel is assigned a value in the red, green, blue (RGB) color domain. The RGB color domain, also referred to in the art as the RGB color model, is an additive representation of a color. In the RGB color domain, each pixel would be assigned a color by assigning an amount of red, green, and blue to the respective pixel, hereinafter referred to as an RGB color value. The combination of this RGB color value would represent the color of the pixel within the digital image. It will be appreciated that the RGB color domain is merely meant to be an example of a possible color domain and that the teachings of this disclosure could be applied to any color domain, or representation of color, without departing from the scope of this disclosure. In various embodiments, digital image 604 can be produced, or captured, by a digital image capture device. Such a digital image capture device could be, for example, a document scanner, a digital camera (video or still), or any other suitable digital image capture device. In other embodiments, digital image 604 may be produced entirely in the digital realm (e.g., computer generated imagery (CGI)).

Graphics editor 602 includes a graphical user interface (GUI) 606. In embodiments, GUI 606 is configured to facilitate a user of graphics editor 602 in performing digital image editing techniques on digital image 604. To accomplish this, GUI 606 can be configured to display digital image 604 to the user and to accept input from the user with respect to the digital image. In embodiments, this input could be selection of a target region that the user would like to replace with a synthesized region that is assembled from a source region. GUI 606 could utilize this input to generate target region information 608 that can be utilized to identify the target region with respect to digital image 604. As an example, the user may utilize GUI 606, in conjunction with an input device (e.g., touch sensors, stylus, mouse, etc.), to identify an object that the user would like to remove from digital image 604 utilizing an image completion process or to identify a portion of digital image 604 that the user would like to move to another location within the digital image utilizing an image reshuffling process. In some embodiments, target region information 608 could take the form of a mask that can be utilized to identify the selected target region within the digital image 604. In other embodiments, target region information 608 could take the form of a series of coordinates (e.g., corner coordinates of a bounding box, or coordinates for each pixel in the target region) that can be utilized to identify the selected target region within digital image 604. It will be appreciated that these embodiments of target region information 608 are merely meant to be illustrative of possible mechanisms for identifying the selected target region within digital image 604 and that any other mechanism capable of identifying the target region could be utilized without departing from the scope of this disclosure.

To accomplish the digital image editing techniques, graphics editor 602 includes image editing engine 612. Image editing engine 612 can take digital image 604 and the target region information 608 as input. In embodiments, image editing engine 612 can include a patch correspondence search module 614, a voting module 616, and a mask module 618. Additionally, image editing engine 612 can include at least one of an invalid pixel incremental search module 626 and a label assignment module 628. In embodiments, these modules may work in conjunction to iteratively perform a patch synthesis technique as described herein.

Patch correspondence search module 614 can be configured to perform an iterative search to find, for each patch in the target region (e.g., target patches 510a-510d of FIG. 5), the closest, or most similar, patch (e.g., source patches 508a-508d of FIG. 5) within a source region in digital image 604. In embodiments, this iterative search can take the form of an approximate nearest-neighbor search. Examples of approximate nearest neighbor searches include, patch matching based searches (e.g., PatchMatch), hashing based searches (e.g., coherency sensitive hashing (CSH)), tree based searches (e.g., kd-tree), or any other suitable approximate nearest-neighbor search. The result of an approximate nearest-neighbor search can be recorded in a map called a nearest-neighbor field (NNF). A nearest-neighbor field can be considered a mapping from a set of patches A in the target region to a set of patches B in the source region. This mapping can be represented by f:A→B. In some embodiments, the nearest-neighbor field can be stored (e.g., in a buffer or other suitable medium) as a set of coordinates. For instance, a notation can be used such that a patch P1 in the source region is defined as P1=S(i,j), where 'i' and 'j' reflect, for example, the coordinates of the upper left corner of patch P in the source region, S. Utilizing this notation, a patch P2 in the target region can be similarly defined as P2=T(k,l). In such a notation, an offset between patches S(i,j) and T(k,l) can be defined as (k−i, l−j). In other embodiments, merely the offset may be stored in the nearest-neighbor field.

An approximate nearest-neighbor search is an iterative optimization search that seeks to optimize, or minimize, an energy function of the nearest-neighbor field. Such an energy function, 'E.' can be expressed by the equation $E=\Sigma D(a,NN(a)), \forall a \in A$, where 'D' represents a distance function (e.g., $L_2$ distance, $L_p$ distance, etc.), 'a' represents a patch in the set of patches A, and NN(a) can be represented by the equation $\operatorname{argmin} D(a,b), \forall b \in B$, where 'D' again represents the distance function, 'b' represents a patch in the set of patches B, and argmin represents the argument of the minimum concept in mathematics. As such, an approximate nearest-neighbor search seeks to find a set of source patches B that has total minimum distance from the corresponding set of target patches in A.

Figure 10A:
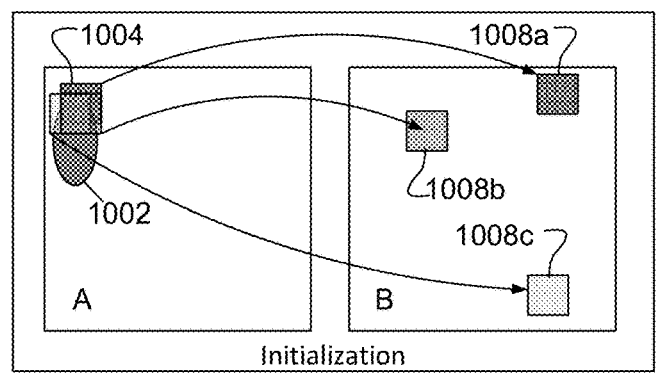
FIGS. 10A through 10C show illustrative examples of a search process performed as part of a patch synthesis technique, in accordance with various embodiments of the present disclosure.
Figure 10B:
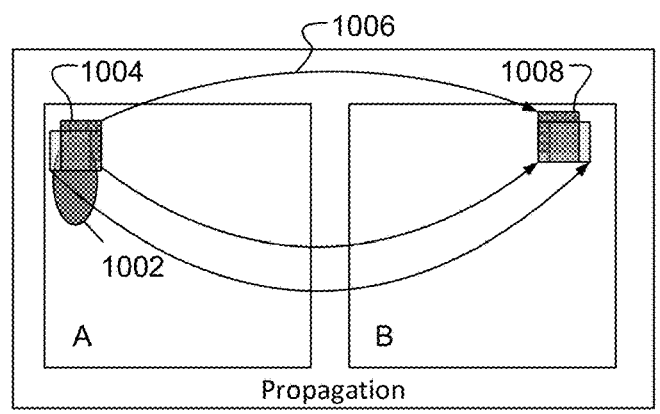
Figure 10C:
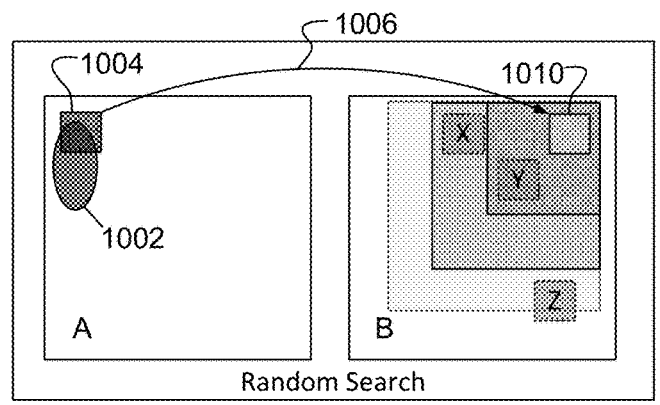

To accomplish the optimization of the energy function discussed above, the approximate nearest-neighbor search may, in some embodiments, begin with an initial population of the nearest-neighbor field. This initial population could be randomly assigned, derived from a nearest-neighbor field from a previous iteration, or otherwise populated with an initial starting point for the approximate nearest-neighbor search. A random initial population is depicted in FIG. 10A. In embodiments, where the nearest-neighbor field is initially populated, an iterative search can be conducted to find a set of patches within the source region that improves upon the initial population of the nearest neighbor field. In some embodiments, this iterative search can have two phases. The first phase being a propagation phase, or linear search phase, in which good solutions (e.g., source patches and respective target patches having a relatively small distance) for neighboring pixels in the target region can be disseminated through a linear search (e.g., scanline order or reverse scanline order). Such a propagation phase is depicted in FIG. 10B. The second phase is a random search phase in which a random patch search can be performed in concentric neighborhoods across the source region to determine if any of these random source patches have a smaller distance than the currently selected source patch. This random phase can be beneficial to prevent the approximate nearest-neighbor search from getting stuck in minima. Such a random phase is depicted in FIG. 10C.

Once a set of source patches B has been found via the approximate nearest neighbor search, these patches can be passed to voting module 616. Voting module 616 can be configured to take the source patches B and utilize these patches to determine a color for each pixel in the target region. This can be accomplished through a blending operation that takes into account the patches that overlap a single pixel to assign a color to that single pixel. The computational cost of this blending operation can be represented by the equation $N^2 * K$, where N is the dimension of the patches, assuming uniform square dimensions, while K represents the number of pixels of the target region. In some embodiments, this blending operation could be a weighted blending operation in which a weighted sum of all the overlapping patches from the nearest-neighbor field is utilized to arrive at a final color for each pixel.

The above discussed patch correspondence search module 614 and voting module 616 can be utilized to iteratively refine the nearest-neighbor field to better approximate estimated colors of the of the target region. In some embodiments, this can be accomplished in a multi-resolution manner. As such, digital image 604 may first be downsampled from an original resolution to a predefined resolution prior to being processed by patch correspondence search module 614 and voting module 616. After a sufficient number of iterations have been performed at this downsampled resolution, the digital image 604 can be upsampled to a next scale and the processing can be repeated, until ultimately digital image 604 is upsampled to meet the original resolution again.

If an area of the target region gets reconstructed by source patches that are coherent, the values of corresponding pixels for the target region will be substantially the same as pixels of the source patches, except at boundaries where different coherent source patches may overlap. As used herein, coherency of a patch means that a shift in the nearest-neighbor field (e.g., offset) corresponds to an equal shift in the source region. For instance, assume (x,y) is a coordinate of a first target patch that is being synthesized and (x',y') is a coordinate of a first source patch that corresponds with the first target patch in the nearest-neighbor field. That is to say that, (x',y') is the coordinate of the best source patch that has been found for the first target patch so far. If a second target patch is indicated by coordinate (x+1, y) and corresponds to a second source patch indicated by the coordinate (x'+1, y), then the first target patch and the second target patch are considered to be coherent. This property of nearest-neighbor fields is often observed in ground truth nearest neighbor fields. As a side effect, the approximate nearest-neighbor fields returned by patch correspondence search module 614 may include large coherent regions having the same nearest-neighbor field offsets. Thus, reconstructed regions can often be formed from big coherent regions. In some instances, these coherent regions can cover a large percentage of the synthesized region at higher resolutions (e.g., later iterations of processing). As mentioned above, the approximate nearest-neighbor search implemented by patch correspondence search module 614 is an iterative optimization search, in which each iteration tries to find a better source patch match for each target patch (e.g., lower distance). However, in an ideal coherent region the patches match exactly and the patch distance is typically zero, so no better patch can be found. As such, these coherent regions, or the pixels therein, can be considered to have converged. Therefore, the patch synthesis technique discussed above can be accelerated by skipping the coherent regions in the processing performed by patch correspondence search module 614 and/or voting module 616. The gain gets larger at the last few finer scales where most of the algorithm time is spent.

Mask module 618 can be configured to generate two types of masks. A first mask can correspond to an active mask that identifies those pixels within a target region that have yet to converge and are still active and those pixels within the target region that have converged and are no longer active. In some embodiments, the active mask can be stored in the form of a binary two dimensional array that stores either a '1' or a '0' value for each pixel within the synthesized target region. The '1' and the '0' value can be utilized to distinguish between those pixels that are still active within the target region and those pixels that are inactive within the target region. For example, a value of '0' at coordinate (c,d) within the active mask could indicate that the pixel at a corresponding location within the target region is still active, while a '1' at coordinate (e,f) within the active mask could indicate that the pixel at a corresponding location within the target region is inactive. It will be appreciated that these values can also be reversed, where '0' indicates active and '1' indicates inactive, without changing the effect of the active mask. It will also be appreciated that the binary mask is merely meant to be an illustrative example and should not be treated as limiting of this disclosure. Any other mechanism suitable for distinguishing between active pixels and inactive pixels is expressly contemplated herein.

To generate the active mask, mask module 618 can be configured to identify, as inactive regions, groupings of pixels within the target region that have converged. In some embodiments, to identify these groupings of pixels within the target region that have converged, mask module 618 can be configured to perform a coherency analysis on the nearest-neighbor fields that were produced by the patch correspondence search module 614. For instance, in one embodiment, for a coordinate (x,y) in the target region, the neighbors' nearest neighbor field coherency can be evaluated to determine whether the pixel at location (x,y) in the target region is active or inactive. For example, in some embodiments, the diagonal neighbors' (e.g., (x−1, y−1), (x+1, y−1), (x−1, y+1), and (x+1, y+1)) nearest neighbor field coherency can be evaluated as depicted in the pseudocode presented below in Algorithm 1. As can be seen in the illustrative pseudocode of Algorithm 1, below, if the number of coherent neighbors is 3 or greater, then the pixel at coordinate (x,y) is marked as inactive, otherwise, the pixel at coordinate (x,y) is marked as active. It will be appreciated that the activeThreshold value of 3 from Algorithm 1 is merely meant to be illustrative and should not be treated as limiting. As another example, in some embodiments, the immediately adjacent neighbors' (e.g., (x+1, y), (x−1, y), (x, y+1), and (x, y−1)) nearest neighbor field coherency can be evaluated in a similar manner to that described above. As another example, in some embodiments, the immediately adjacent neighbors' and the diagonal neighbors' nearest neighbor field coherencies can be evaluated in conjunction in a similar manner to that described above. It will be appreciated that the above examples are merely meant to be illustrative. There are numerous ways to establish whether a pixel is active or inactive, and this disclosure should not be limited based on the manner in which a pixel is determined to be active or inactive.

| Algorithm 1 - Active Mask Method |
|---|
| 1.     coherentCount = 0 |
| 2.     activeThreshold = 3 |
| 3.     activePixel = 1 |
| 4.     inactivePixel = 0 |
| 5.     coherentCount = (NNF[x−1, y−1] == NNF[x,y] + (−1, −1)) |
| 6.     coherentCount += (NNF[x+1, y−1] == NNF[x,y] + (+1, −1)) |
| 7.     coherentCount += (NNF[x−1, y+1] == NNF[x,y] + (−1, +1)) |
| 8.     coherentCount += (NNF[x+1, y+1] == NNF[x,y] + (+1, +1)) |
| 9.     if coherentCount >= activeThreshold then |

| -continued |
|---|
| Algorithm 1 - Active Mask Method |
| 10.        activeMask[x,y] = inactivePixel |
| 11.   else |
| 12.        activeMask[x,y] = activePixel |
| 13.   end if |

In some embodiments, active mask module 618 can be further configured to erode the inactive regions, or dilate the active regions, by marking those pixels at the edge of the inactive regions within the active mask as active. In such embodiments, the size of the patch of the patch synthesis technique can be utilized to determine the distance in pixels to erode from the edge. This can account for instances where boundaries of different coherent source patches may overlap. For example, consider a patch width of 7. A patch whose all 49 (e.g., 7×7) pixels are coherent with their four neighbors (e.g., diagonal or immediately adjacent) is an exact replica of its nearest neighbor patch in the source image (e.g., distance=0). Such a patch should not change anymore and thus the entire patch can be declared inactive and the searching process for this patch and the voting process for this patch's pixel colors can stop. On the contrary, in such an example, any patch that touches an active pixel at a distance of 3 pixels, or approximately ½ of the patch width, cannot be guaranteed to have fully converged yet and might still change in the next iteration of the patch synthesis technique. As a result, the inactive regions within the active mask can be eroded by 3 pixels in an effort to better define the inactive regions within the active mask and this active mask can be utilized for the next search and/or vote steps.

The active mask generated by mask module 618 need not be limited to the translation domain. As utilized herein, the translation domain refers to patches that have not been manipulated (e.g., via rotation, reflection, scale, perspective, etc.). Translation is a term commonly used in geometry to describe a function that moves an object a certain distance. In the context of the approximate nearest neighbor searching discussed herein, translation specifically refers to searching for a new candidate that is some horizontal and vertical distance from a given point. The active mask can be equally applied to the transformation domain where patches have been manipulated in some manner. However, it will be appreciated that, where the active mask is applied to the transformation domain a like transformation would be applied to the above discussed coherency analysis. For example, if a source patch has been rotated 90 degrees then the above discussed coherency analysis would also need to be rotated 90 degrees.

Once the active mask has been generated, it can be utilized by image editing engine 612, patch correspondence search module 614, and/or voting module 616 to limit further processing of the inactive pixels identified by the active mask and thereby reduce the number of computations performed in the patch synthesis technique. As such, each of these components can be configured to utilize the active mask in the processing described above with respect to each of these components. In some embodiments, the active mask could be utilized to prevent voting on those pixels that are indicated as inactive by the active mask. In other embodiments, an active mask from a previous iteration of the patch synthesis technique can be utilized to limit the approximate nearest-neighbor searching being performed. In still other embodiments, an active mask can even be upsampled to be utilized in as an initial active mask for the next scale up.

Such a scenario is discussed in greater detail in reference to block 820 of FIG. 8, below. In some embodiments, the active mask can be generated for every iteration at every scale of the patch synthesis technique. In other embodiments, the active mask can be utilized for specific iterations within the patch synthesis technique. For example, as mentioned earlier, the gain realized by utilizing the active mask to limit further processing of inactive pixels gets larger at the last few finer scales where most of the processing time is spent. As such, the active mask could only be utilized in these last few finer scales.

Mask module 618 can also generate a validity mask for an image. As described above, a validity mask can correspond to a mask that includes one of three values for each pixel in an image. Pixels within the target region can either be assigned a value of "valid" or "invalid", while pixels outside of the target region can receive a value of "undefined". In a binary representation, this could be stored as a two-bit value. A validity mask can be created for an image when the image is upsampled (or downsampled) to a new scale and when it is desired to upsample (or downsample) additional information about the target region. For example, when an image is processed to remove an undesirable object, an active mask may not be created after the initial downsample. Since patch synthesis has not been used yet to assign patches to pixels in the target region, creating an active mask after the initial downsampling is typically unnecessary.

After upsampling (or downsampling) to a new scale when additional information is also upsampled (or downsampled), at least one of invalid pixel incremental search module 626 and label assignment module 628 can be used to provide pixel assignments for any invalid pixel patch assignments that may have occurred. The invalid pixel incremental search module 626 and/or label assignment module 628 can receive an initial count of invalid pixels when the validity mask is formed. During operation of invalid pixel incremental search module 626 and/or label assignment module 628, the count of invalid pixels can be reduced each time a pixel is converted from an invalid pixel to a valid pixel (i.e., by assigning an appropriate patch to the pixel). If invalid pixel incremental search module 626 is used, the module can operate by performing a concentric shell search until either a maximum search radius is achieved or until the invalid pixel count is reduced to zero. If label assignment module 628 is used, the module can operate by assigning pixel values based on nearest neighbor valid pixels (determined using a distance evaluation, such as a distance transform performed by label assignment module 628), until the invalid pixel count is reduced to zero. If both modules are used, the invalid pixel count can initially be reduced by invalid pixel incremental search module 626. If the invalid pixel count is reduced to zero, then use of the label assignment module 628 can be omitted. If the invalid pixel count is not reduced to zero, then the invalid pixel count can be passed to label assignment module 628.

Once the image editing engine 612 has completed the image editing technique, the resulting synthesized digital image 620 can be output (e.g., to a display, printer, etc.). Some non-limiting examples that can benefit from a the technique described herein utilizing and active mask to reduce processing include: image completion, image reshuffling, image texture synthesis, image retargeting, image warping, image blending, image texture interpolation, image harmonization, image style transfer, texture by numbers, or any other digital image editing technique that manipulate a nearest neighbor field. It will be appreciated that, while the above discussions concentrated on digital image editing techniques, that the embodiments discussed herein could also be extended to space time to be applied to video applications as well. As such, the embodiments discussed herein could be extended to video completion, video reshuffling, video retargeting, video warping, video blending, video texture interpolation, video harmonization, video style transfer, video texture by numbers, or any other video editing process that involves manipulation of a nearest neighbor field. Extension of the descriptions herein to these video editing techniques will be readily understood by one of ordinary skill in the art.

Figure 7:
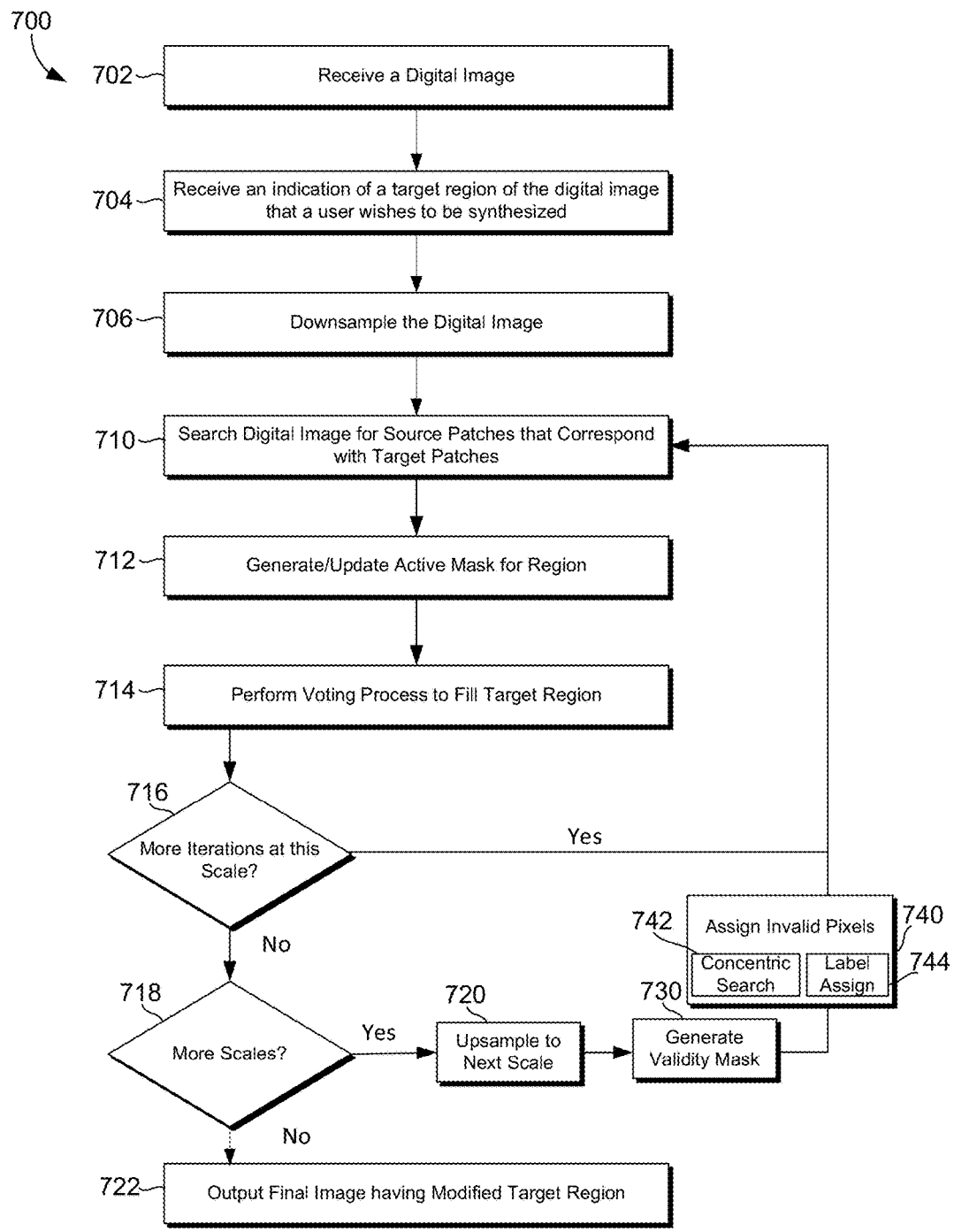
FIG. 7 illustrates a process flow depicting an example patch synthesis technique, in accordance with various embodiments of the present disclosure.

FIG. 7 illustrates a process flow 700 depicting an example patch synthesis technique, in accordance with various embodiments of the present disclosure. Process flow 700 could be carried out, for example by graphics editor 602 of FIG. 6. As depicted, process flow 700 can begin at block 702 where a digital image (e.g., digital image 604 of FIG. 6) is received. At block 704, an indication of a target region of the digital image that a user wishes to be synthesized can also be received. In embodiments, such an indication could be a selection of a target region (e.g., via GUI 606 of FIG. 6) that the user would like to be synthesized from a source region. As an example, the user could identify an object that the user would like to remove from the digital image utilizing an image completion process or identify a portion of the digital image that the user would like to move to another location within the digital image utilizing an image reshuffling process.

In some embodiments, the patch synthesis technique can be performed in a multi-resolution manner. In such a multi-resolution manner, the processing may begin with a low resolution image and can increase the resolution throughout the patch synthesis technique until an original resolution of the digital image is achieved. As such, at block 706, the resolution of the digital image can be downsampled from an original resolution to a predefined resolution in anticipation of further processing.

An iterative search can be performed at block 710 to find, for each target patch in the selected target region (e.g., target patches 510a-510d of FIG. 5), the closest, or most similar, source patches (e.g., source patches 508a-508d of FIG. 5) within a source region of the digital image. In embodiments, this iterative search can take the form of an approximate nearest-neighbor search discussed in detail in reference to FIGS. 6 and 8.

At block 712, an active mask can be generated, or updated, based on the results of the iterative search. As discussed previously, an active mask distinguishes between those pixels within a target region that have yet to converge and therefore are still active and those pixels within the target region that have converged and therefore are no longer active. To generate the active mask, pixels within the target region can be analyzed to determine groupings of pixels that have converged (e.g., via the coherency analysis discussed in reference to FIG. 5, above). It will be appreciated that an active mask need not be produced, or updated, with every iteration of process flow 700. As such, block 712 can be skipped or omitted for some iterations and implemented for others. Generation of an active mask is discussed extensively in reference to FIGS. 5 and 9.

Based on the results of the iterative search, a voting process can be performed at block 714 to determine a color for each pixel in the target region. This can be accomplished through a blending operation that takes into account the source patches that overlap each pixel to assign a color to each single pixel. In some embodiments, this blending operation could be a weighted blending operation in which a weighted sum of all the overlapping patches from the nearest-neighbor field is utilized to arrive at a final color for each pixel. In iterations where an active mask was generated at block 712, the voting process can also take into account those pixels that are indicated as inactive by the active mask. As such, the voting process would ignore those pixels within the target region that are indicated as inactive by the active mask, thereby eliminating the processing cost associated with those inactive pixels.

At block 716, if there are more iterations to be performed at the current scale, then the process returns to block 710 where the above described process is repeated. In some embodiments, where an active mask has been generated at one iteration, that active mask may be utilized at block 710 in the next iteration. In such embodiments the iterative search process performed at block 710 would ignore those pixels within the target region that are indicated as inactive by the active mask, thereby eliminating the processing cost associated with those inactive pixels If, on the other hand, there are no more iterations to be performed at the current scale then the process proceeds from block 716 to block 718. At block 718, if there are more scales to be processed, then the process proceeds to block 720 where the digital image is upsampled to the next scale. In some embodiments, the most recent iteration's nearest-neighbor field (or other patch correspondence information) can also be upsampled.

Upsampling of the most recent iteration's nearest-neighbor field (or other patch correspondence information) can be a delicate process since one or more invalid pixels may be the result of source/target mapping. A validity mask can be generated 730 to allow for identification of any invalid pixels that are created. In various aspects, the validity mask can include values of valid, invalid, or undefined for the pixels in an image, as described above. Optionally, the values of valid and invalid can be used for pixels within a target region, while undefined is assigned to pixels outside of the target region.

In the example shown in FIG. 7, after identifying invalid pixels, valid patches can be assigned 740 to the invalid pixels. The assigning 740 of valid patches can be performed using a concentric search 742 that is centered on each invalid pixel (as described above); or the assigning 740 can be performed using label assignment 744 based on the closest valid pixel (also as described above); or a combination of concentric search 742 and label assignment 744 can be used.

In some embodiments, the active mask can also be upsampled at block 720. To gain additional benefit from the active mask it may be desirable to maintain the ability to start with an existing active mask for the first iteration as we move from one scale to the next scale. This could be especially important for the last few scales, where the bulk of computational budget may be spent. As such, the current nearest-neighbor field can be upsampled and a new, or updated, active mask can be generated from this upsampled nearest-neighbor field. It will also be appreciated that the active mask from the current scale can be utilized to reduce the processing that occurs in upsampling the image to the next scale.

Once the digital image is upsampled, the processing returns to block 710. If there are no more scales to be processed, then the processing can proceed to block 722 where a final image having a modified, or synthesized, target region can be output (e.g., to a display, printer, etc.).

Figure 8:
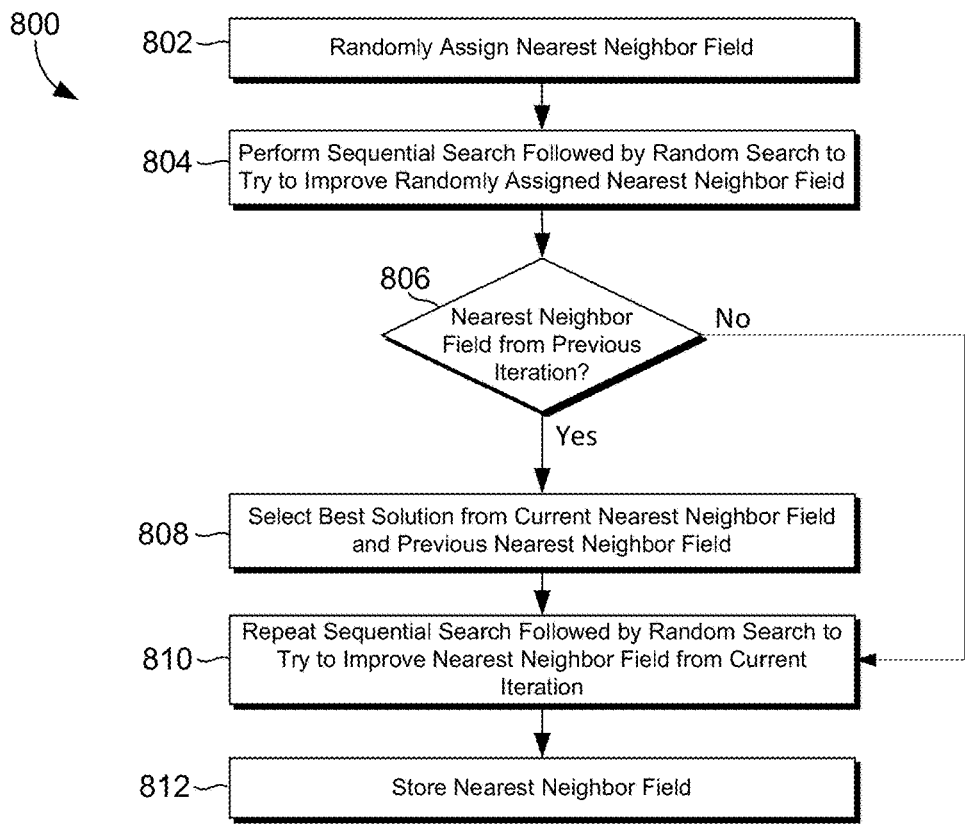
FIG. 8 illustrates a process flow depicting an example approximate nearest-neighbor search, in accordance with various embodiments of the present disclosure.

FIG. 8 illustrates a process flow 800 depicting an example approximate nearest-neighbor search to find to find a set of source patches from a source region that has minimum possible distance from a corresponding set of target patches for target region, in accordance with various embodiments of the present disclosure. Process flow 800 could be carried out, for example, by patch correspondence search module 614 of FIG. 6. As depicted, process flow 800 can begin at block 802 where, in the depicted embodiment, the nearest-neighbor field is initially populated in a random manner. In other embodiments, this initial population could be derived from a nearest-neighbor field from a previous iteration (e.g., of process 700 of FIG. 7), or otherwise populated with an initial starting point for the approximate nearest-neighbor search. A random initial population is depicted in FIG. 10A. From this initial population of the nearest-neighbor field, at block 804 an iterative search can be conducted to find a set of patches within the source region that improves upon the initial population of the nearest neighbor field. In some embodiments, this iterative search can have two phases. The first phase being a propagation phase, or linear search phase, in which good solutions (e.g., source patches and respective target patches having a relatively small distance) for neighboring pixels in the target region can be disseminated through a linear search (e.g., scanline order or reverse scanline order). Such a propagation phase is depicted in FIG. 10B. The second phase is a random search phase in which a random patch search can be performed in concentric neighborhoods across the source region to determine if any of these random source patches have a smaller distance than the currently selected source patch. This random phase can be beneficial to prevent the approximate nearest-neighbor search from getting stuck in minima. Such a random phase is depicted in FIG. 10C.

At block 806 a determination is made as to whether a nearest neighbor field is available from a previous iteration. If a nearest neighbor field is not available from a previous iteration, then the processing proceeds to block 810 where the nearest-neighbor field produced at block 804 is stored. If, on the other hand, a nearest neighbor field is available from a previous iteration, then the processing can proceed to block 808 where the mapping with the smaller distance from each location within the current nearest neighbor field and the previous nearest neighbor field is selected for each location within the nearest neighbor field. The processing can then proceed to block 810.

At block 810 the iterative search performed at block 804 can be repeated in an attempt to further refine the nearest-neighbor field. From block 810, the process flow can proceed to block 812 where the nearest neighbor field is stored. It will be appreciated that in process flow 800 each pixel within the target region is processed. As such, in embodiments where an active mask is available, process flow 800 can be configured to ignore processing of those pixels that are indicated by the active mask as being inactive, which can save processing time and speed up the approximate nearest-neighbor search.

Figure 9:
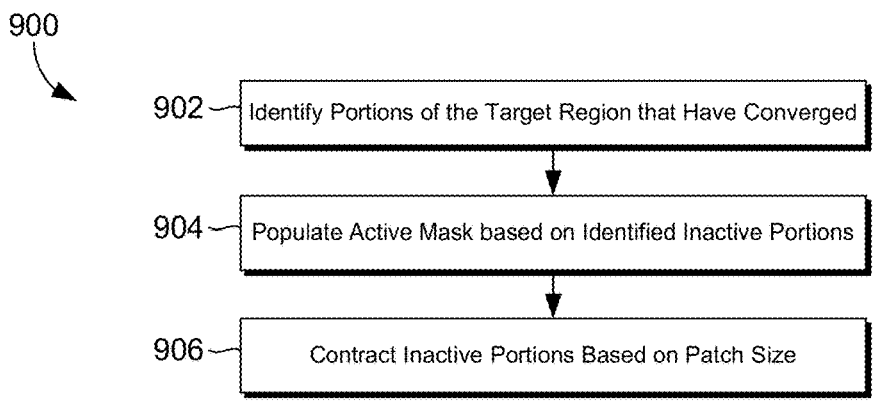
FIG. 9 illustrates a process flow depicting an example active mask generation, in accordance with various embodiments of the present disclosure.

FIG. 9 illustrates a process flow 900 depicting an example active mask generation for a target region, in accordance with various embodiments of the present disclosure. Process flow 900 could be carried out, for example, by active mask module 618 of FIG. 6. As depicted, process flow 900 can begin at block 902 where portions of the target region are identified as having converged. In some embodiments, to identify these portions of the target region that have converged, a coherency analysis, such as that discussed in reference to FIG. 5, can be performed on a nearest neighbor field of the target region.

At block 904, the active mask can be populated based on those portions of the target region that have been determined to have converged. In some embodiments, this could include populating a binary two dimensional array that stores either a '1' or a '0' value for each pixel within the target region. The '1' and the '0' value can be utilized to distinguish between those pixels that are still active within the target region and those pixels that are inactive within the target region. It will also be appreciated that the binary mask is merely meant to be an illustrative example and should not be treated as limiting of this disclosure. Any other mechanism suitable for distinguishing between active pixels and inactive pixels is expressly contemplated herein.

At block 906, the inactive regions of the active mask can be eroded by marking those pixels at the edge of the inactive regions within the active mask as active. In such embodiments, the size of a patch of a patch synthesis technique utilized in processing the target region can be utilized to determine the distance in pixels to erode from the edge. This can account for instances where boundaries of different coherent source patches may overlap. For example, consider a patch width of 7. A patch whose all 49 (e.g., 7×7) pixels are coherent with their four neighbors (e.g., diagonal or immediately adjacent) is guaranteed to be an exact replica of its nearest neighbor patch in the source image (e.g., distance=0). Such a patch should not change anymore and thus the entire patch can be declared inactive and further searching and/or voting processes for this patch can stop. On the contrary, in such an example, any patch that touches an active pixel at a distance of 3 pixels, or approximately ½ of the patch width, cannot be guaranteed to have fully converged yet and might still change in the next iteration of the patch synthesis technique. As a result, the inactive regions within the active mask can be eroded by 3 pixels in an effort to better define the inactive regions within the active mask and this active mask can be utilized for the next search and/or vote steps.

FIGS. 10A through 10C show illustrative examples of a search process performed as part of a patch synthesis technique, in accordance with various embodiments of the present disclosure. FIG. 10A depicts a random initialization phase of a search process for filling target region 1002 of image A. As depicted in FIG. 10A the nearest-neighbor field for each of the target patches represented collectively by 1004 has been randomly initialized to map to source patches 1008*a-c* as indicated by the arrows connecting the various patches. These mappings can be improved in one or more iterations of an approximate nearest-neighbor search an example of which is depicted in FIGS. 10B and 10C.

In some implementations, a propagation phase can be carried out as illustrated in FIG. 10B. For example, assume that patches 1004 in image A have each been mapped to patches 1008 in image B as indicated by the arrows. Neighboring patches of each of patches 1004 can now be evaluated to determine what mappings they have, and whether any of these mappings can be applied to any of patches 1004 for a better result (e.g., smaller distance). In some implementations, an algorithm can look at the four immediately adjacent pixels, or all pixels in a circular or square neighborhood of a defined diameter (e.g., 2 or 4), and/or any subset of the pixels within a fixed distance of the pixel at which propagation occurs, to name just a few examples. The term propagation indicates that good mappings for one patch can be propagated to neighboring patches to improve their mappings. Thus, for example, if a local maxima of correspondence exists in mappings of a neighborhood around the patches 1004, it can be detected in the propagation phase.

In some situations, the propagation phase may not find the globally best mapping and may get stuck in minima. A perturbation such as a random-search phase can therefore be used as schematically illustrated in FIG. 10C. Here, the individual patch represented by 1004 is initially mapped to 1010, for example resulting from the propagation phase depicted in FIG. 10C. One or more randomly selected patches can then be evaluated. For example, patches X, Y, and Z can be randomly selected in the image B. In some implementations, patches X-Z are selected to have gradually increasing or decreasing distance from the location of the original mapping target in the image B. For example, a random distribution can be used that includes nearby locations (e.g., patch Y) and locations further away (e.g., patch Z), wherein the distribution places more weight, via a distribution function, on distances of nearby locations than would be obtained from uniform sampling. The patches X-Z can be evaluated to determine whether any of these patches has a better correspondence (e.g., smaller distance) with patch 1004.

Figure 11:
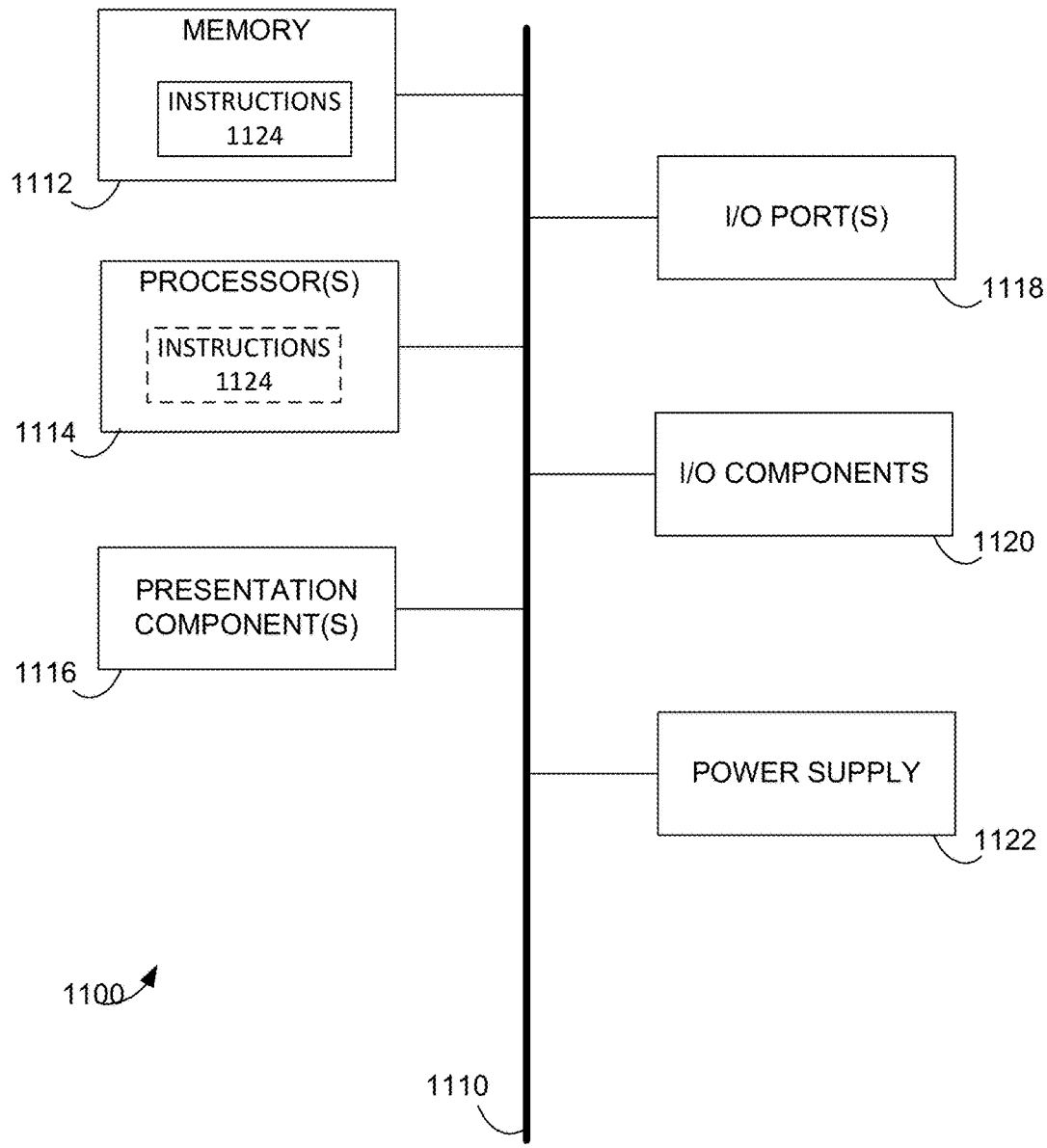
FIG. 11 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 11, an illustrative operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output ports 1118, input/output components 1120, and an illustrative power supply 1122. Bus 1110 represents what may be one or more busses (such as an address bus, data bus, or combination thereof). Although the various blocks of FIG. 11 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 11 is merely illustrative of an example computing device that can be used in connection with one or more embodiments of the present disclosure. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer storage media in the form of volatile and/or nonvolatile memory. As depicted, memory 1112 includes instructions 1124. Instructions 1124, when executed by processor(s) 1114 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Illustrative presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. One or more non-transitory computer-readable storage media having instructions stored thereon, which, when executed by one or more processors of a computing device, provide the computing device with a graphics editor to:

perform a patch synthesis process on a target region of an image at a first image scale to determine first patch correspondence information for pixels in the target region at the first image scale, the first patch correspondence information comprising a first map of patches from a source region assigned to pixels in the target region at the first image scale;

generate the image at a second image scale based on sampling of the image at the first image scale;

generate second patch correspondence information for pixels in the target region at the second image scale, the second patch correspondence information comprising a second map of patches from the source region assigned to the pixels in the target region at the second image scale, wherein one or more pixels in the target region have an invalid patch assignment based on at least a scaling operation from the first image scale to the second image scale;

perform an incremental search on at least one pixel of the one more pixels having an invalid patch assignment to identify a pixel having a valid patch assignment; and assign to the at least one pixel a patch corresponding to the valid patch assignment for the identified pixel.

2. The one or more computer-readable storage media of claim 1, wherein the instructions provide the computing device with a graphics editor to further generate a validity mask that indicates pixels having an invalid patch assignment and pixels having a valid patch assignment.

3. The one or more computer-readable storage media of claim 2, wherein the validity mask further indicates pixels located outside of the target region, the indication for pixels located outside of the target region being different from the indication for pixels having an invalid patch assignment and the indication for pixels having a valid patch assignment.

4. The one or more computer-readable storage media of claim 1, wherein the instructions provide the computing device with a graphics editor to further perform a second patch synthesis process on the target region of the image at the second image scale to determine third patch correspondence information for pixels in the target region at the second image scale, the third patch correspondence information comprising a third map of patches from the source region assigned to pixels in the target region at the second image scale.

5. The one or more computer-readable storage media of claim 4, wherein the instructions provide the computing device with a graphics editor to further generate an active mask that indicates one or more portions of the target region as inactive, the one or more portions being composed of groupings of pixels that have converged, wherein at least a portion of the second patch synthesis process ignores the one or more portions indicated as inactive by the active mask.

6. The one or more computer-readable storage media of claim 1, wherein the image at the second scale comprises a higher pixel density than the image at the first scale.

7. The one or more computer-readable storage media of claim 1, wherein the image comprises the source region.

8. The one or more computer-readable storage media of claim 1, wherein the image comprises the target region, the source region, and at least one additional pixel.

9. The one or more computer-readable storage media of claim 1, wherein to perform a patch synthesis process includes:
performance of an approximate nearest-neighbor search process to identify the portions of the source region that are to be utilized in synthesizing the target region; and
performance of a voting process, based on the identified portions of the source region, to generate colors for individual pixels within the target region.

10. The one or more computer-readable storage media of claim 1, wherein the incremental search comprises a concentric shell search to identify a pixel in a concentric shell having a valid patch assignment.

11. The one or more computer-readable storage media of claim 1, wherein the first patch correspondence information comprises a nearest-neighbor field.

12. A computer-implemented method for synthesizing digital images comprising:

performing a patch synthesis process on a target region of an image at a first image scale to determine first patch correspondence information for pixels in the target region at the first image scale, the first patch correspondence information comprising a first map of patches from a source region assigned to pixels in the target region at the first image scale;

generating the image at a second image scale based on sampling of the image at the first image scale;

generating second patch correspondence information for pixels in the target region at the second image scale, the second patch correspondence information comprising a second map of patches from the source region assigned to pixels in the target region at the second image scale, wherein one or more pixels in the target region have an invalid patch assignment based on at least a scaling operation from the first image scale to the second image scale;

generating a validity mask that indicates pixels having an invalid patch assignment and pixels having a valid patch assignment;

performing, for at least one pixel of the one more pixels having an invalid patch assignment, a distance evaluation between the at least one pixel and a plurality of pixels having a valid patch assignment in the validity mask; and assigning, to the at least one pixel, a patch corresponding to a nearest neighbor pixel based on the performed distance evaluation.

13. The computer-implemented method of claim 12, wherein the validity mask further indicates pixels located outside of the target region, the indication for pixels located outside of the target region being different from the indication for pixels having an invalid patch assignment and the indication for pixels having a valid patch assignment.

14. The computer-implemented method of claim 12, wherein performing a distance evaluation comprises computing a distance transform for the at least one pixel, the distance transform being computed prior to at least one of performing the patch synthesis process on the target region of the image at the first image scale and generating the image at the second image scale based on sampling of the image at the first scale.

15. The computer-implemented method of claim 12, further comprising performing a second patch synthesis process on the target region of the image at the second image scale to determine third patch correspondence information for pixels in the target region at the second image scale, the third patch correspondence information comprising a third map of patches from the source region assigned to pixels in the target region at the second image scale.

16. A computing system for synthesizing digital images comprising:
one or more processors; and
one or more computer-readable storage media, coupled with the one or more processors, having instructions stored thereon, which, when executed by the one or more processors, provide the computing system with a graphics editor to:
perform a patch synthesis process on a target region of an image at a first image scale to determine first patch correspondence information for pixels in the target region at the first image scale, the first patch correspondence information comprising a first map of patches from a source region assigned to pixels in the target region at the first image scale;

generate the image at a second image scale based on sampling of the image at the first image scale;

generate second patch correspondence information for pixels in the target region at the second image scale, the second patch correspondence information comprising a second map of patches from the source region assigned to the pixels in the target region at the second image scale, wherein one or more pixels in the target region having an invalid patch assignment based on at least a scaling operation from the first image scale to the second image scale;

generate a validity mask that indicates pixels having an invalid patch assignment and pixels have a valid patch assignment;

perform a concentric shell search on at least a first pixel of the one more pixels having an invalid patch assignment to identify a pixel in a concentric shell having a valid patch assignment;

assign to the at least a first pixel a patch corresponding to the valid patch assignment for the identified pixel;

perform, for at least a second pixel of the one more pixels having an invalid patch assignment, a distance evaluation between the at least a second pixel and a plurality of pixels having a valid patch assignment in the validity mask; and assign, to the at least a second pixel, a patch corresponding to a nearest neighbor pixel based on the performed distance evaluation.

17. The computing system of claim 16, wherein the concentric shell search comprises a maximum search radius, the at least a second pixel comprising one or more pixels having a nearest neighbor pixel beyond the maximum search radius.

18. The computing system of claim 16, wherein the validity mask further indicates pixels located outside of the target region, the indication for pixels located outside of the target region being different from the indication for pixels having an invalid patch assignment and the indication for pixels having a valid patch assignment.

19. The computing system of claim 16, wherein the distance evaluation comprises computing a distance transform for the at least one pixel.

20. The computing system of claim 16, wherein the distance transform comprises at least one of a Manhattan distance transform and a chessboard distance transform.

* * * * *